Sept. 25, 1945.                    D. SAMIRAN                    2,385,381
                             SAFETY LOCKING DEVICE
                             Filed March 27, 1943
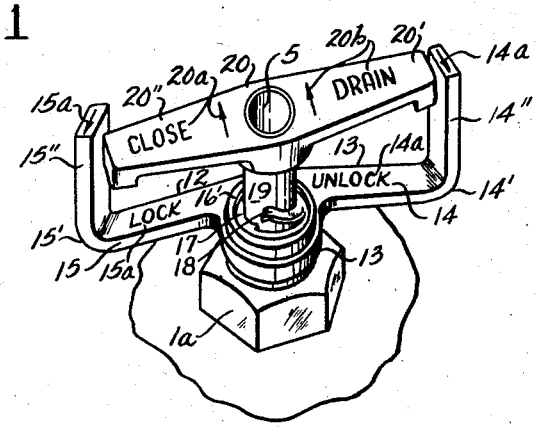
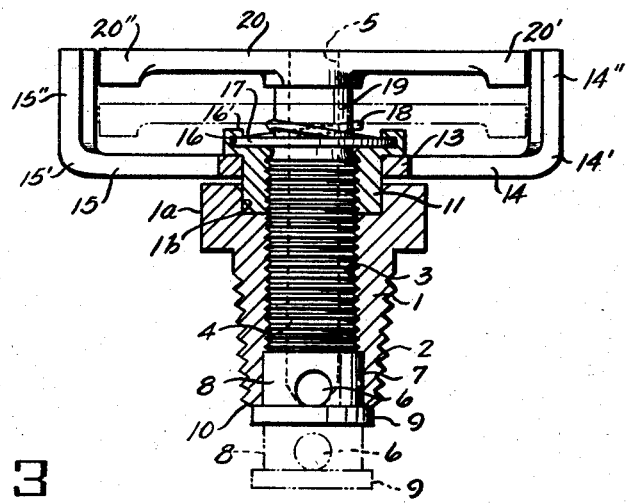
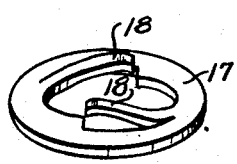
INVENTOR
DAVID SAMIRAN
BY
ATTORNEYS Patented Sept. 25, 1945

2,385,381

UNITED STATES PATENT OFFICE 2,385,381

SAFETY LOCKING DEVICE

David Samiran, Osborn, Ohio

Application March 27, 1943, Serial No. 480,873

8 Claims. (Cl. 137—34)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to locking devices, and, more particularly, to safety locking means for securing a rotary member, such as an actuating stem for a valve, drain cock, hose clamp, or other similar device, to prevent rotation thereof when the locking means is in locking position.

When the aforementioned devices are used on airplanes, particularly in connection with the engines or fuel systems, it has been customary to employ safety wire ties between the rotary member or operating stem and a stationary part to make the stem secure against loosening due to vibration and other causes. Many of these devices are located in remote places where access thereto is difficult, and servicing operations, such as removing the safety wires, opening and subsequently closing the drain cocks, valves, etc., and replacement of the safety wires becomes complicated and difficult, and therefore considerable time is often consumed before these safety wires can all be replaced. If the conventional jam nut locking means are used on these stems, it is often impossible to properly service the devices without special wrenches or tools, due to the substantially inaccessible locations of some of the devices, and therefore making the jam nuts sufficiently tight to be absolutely secure against accidental loosening becomes a problem. In addition, there is no way to definitely determine by casual inspection whether the jam nuts are tightened, especially when these devices are serviced in the dark, or in places where access thereto is difficult.

An object of my invention is therefore the provision of locking means for rotary members, such as the actuating stems for drain cocks, valves, hose clamps, etc., which is extremely simple to operate, and can be easily manipulated to locking or release positions in places where access thereto is difficult, or in the dark, without the use of special wrenches or tools.

Another object is the arrangement of cooperating locking means for a rotary stem member including indicating means for locking means whereby a visual or casual inspection will determine whether the locking means is in operative position or not, and in which said indicating means constitutes means to move said locking means to locking position.

A still further object is the employment of associated lever actuating means for the stem and for the locking means, so that said lever actuating means for the locking means occupies a predetermined relation with respect to the lever actuating means for the stem when in locking position to indicate that the device is in locked condition, and in which the ends of said lever means are arranged to be clamped between the jaws of a pair of pliers to provide a powerful torque for moving the locking means to locking position, or in which the locking means, when in locking position, is easily and conveniently moved to released position by the use of a simple pry member such as a screw driver, used as a lever between the aforesaid lever means.

Another object is the provision of a rotatable locking means for rotary operating stem members in which said locking means is always free to rotate on the stem, except when the same is in locked position.

The above and other objects and advantages of the invention will appear more fully from the detailed description and the annexed drawing, disclosing, for purposes of illustration, my invention, as applied to the actuating stem of a drain cock, like reference characters referring to like parts in the several figures of the drawing, in which Fig. 1 is a perspective view of my improved locking device as applied to a drain cock.

Fig. 2 is a longitudinal sectional view through the drain cock as disclosed in Fig. 1, the drain valve stem and spring washer being shown in elevation.

Fig. 3 is a detailed perspective view of the spring washer employed in my construction.

Referring particularly to the disclosure as seen in Figs. 1 and 2, illustrating my invention as applied to a drain cock, the numeral 1 indicates a drain cock body which is threaded at 2 and designed to be inserted into a suitable threaded opening, in the customary manner, in a receptacle or other device that is desired to drain. The drain cock body 1 is formed with the usual axially threaded passage 3 to receive the threaded operating stem or drain plug member 4. This operating stem or core member 4 is formed with a central drain passage 5 extending from the outer end thereof to a point adjacent the inner end where the passage 5 joins a lateral passage 6 extending through both sides of the plug member.

The lower extremity of the drain cock body 1 is counter-bored, as indicated at 7, to receive the enlarged cylindrical portion 8 formed on the stem and having the lateral passage 6 therein.

The inner end of the stem is closed and is provided with an annular seating flange 9 designed to seat on the inner end 10 of the body 1, and thus seal the drain cock device against leakage when the stem 4 is screwed outwardly, as seen in full lines in Fig. 2.

The body 1 is provided with the usual enlarged wrench or tool engaging portion 1A having an annular recess 1B formed therein to receive the locking or jam nut member 11, rotatably mounted on the threaded portion of the stem 4. The jam nut member 11 carries an actuating handle member 12 comprising a central ring member 13, flash-welded or otherwise secured to the cylindrical part of the jam nut or locking member 11. The ring member carries laterally extending arms 14 and 15, bent near their extremities, as at 14' and 15' to provide upstanding end portions 14" and 15", disposed in spaced substantially parallel relation to each other at opposite sides of the axis of rotation of the locking member 11.

The locking member 11 is formed with an annular recess 16 for the reception of a spring washer 17, as seen in detail in Fig. 3. This washer 17 is provided with a pair of laterally bent spring fingers 18 extending beyond the outer face thereof, when the washer is placed in the recess 16. After the washer 17 is mounted in the recess 16, the outer edge or rim of the recess is preferably bent or spun over to form a retaining flange, as indicated at 16' in Fig. 2 of the drawing.

The stem member 4 is formed with a reduced, unthreaded end portion, as indicated at 19, of a diameter and length to permit the jam or locking nut member to turn freely thereon without axial movement of the locking nut on the stem. A stem actuating handle member 20 is secured on the reduced end portion 19 in a predetermined relation to the position of the upturned ends 14" and 15" of the handle 12, when the operating stem is in operative position, such as when drain head 9 is tightly seated against the end 10 of the body 1 and the locking member 11 is tightly jammed in locking position against the base of the recess 1B in the body 1.

The stem-operating handle is flash-welded or otherwise permanently secured to the end of the stem 4 in a position where the opposite ends 20' and 20" of the handle member 20 are positioned adjacent the upturned ends 14 and 15", somewhat in the manner disclosed in Fig. 1, so that a pair of pliers can be operated with the jaws thereof engaging the arm extremities 20" and 15" of the handle members 20 and 12 to exert a powerful turning torque on the locking member when the pliers are closed, moving the parts to a secure locking position.

When in locking position, the handle member 20 preferably occupies a substantially parallel, partially overlapping relation with respect to the ends 14" and 15" of the arms 14 and 15, so that visual inspection, when the parts are in this locking position, will indicate the device to be secure against accidental release.

In the loosening operation, a pry member may be used, such as a screw driver, between the aforementioned arms 20" and 15", or the other ends of said arms, 20' and 14 may be grasped between the jaws of the pliers, which, due to the leverage of the arms, affords a slight turning torque to the jam or locking nut 11, thus releasing the stem member 4.

The locking member of my improved device is freely rotatable on the stem at all times, except when it is in locking position, as shown in full lines on Fig. 2, so that the mechanic can determine by touch if the device is locked or not. If the handle 14 is movable, the device is not secured.

When the jam nut member 11 is rotated in the unlocking direction, it will be moved axially along the threads on the stem 4 into the reduced or unthreaded part 19 on the stem, where it will be freely rotatable. It is not possible to rotate the locking nut into jamming relation with the handle member 20 of the stem as is the case with the usual jam nut, where it is possible for the servicing mechanic to think, due to the resistance to turning of the locking nut, because of its engagement with the handle, that the stem is securely locked against rotation.

When the locking member 11 is unscrewed, and moves onto the unthreaded or reduced portion 19 of the stem member 4, the spring fingers 18 of the spring washer 17 carried by the lock nut member, engage the inner face of the handle member 20, exerting a resilient axial pressure on the locking member 11, tending to urge the same toward the threaded portion of the stem 4, so that, as the locking member is rotated in a locking direction, it will be immediately moved into engagement with the threads on the stem, and continued rotation will move the locking member 11 into jamming relation with the body 1.

When the drain cock is moved to open, or draining position, as seen in broken lines in Fig. 2, the handle member 12 is first rotated to relieve its jamming or locking engagement between the stem 4 and supporting body 1, after which the hollow stem can be rotated to uncover the lateral drain passages 6. As the stem is screwed inwardly, to open the drain, it is moved so that the projecting ends 14—15" of the handle 12 are located above the top or outer surface of the extremities 20'—20" of the handle member 20. A mechanic, by feeling the relative out-of-alignment or out-of place relation of the extremities of these parts, will know that the stem and locking member are not in proper locking relation, since the upturned ends 14—15" and the outer surface of the handle 20 are in the same plane, with the ends 20'—20" of the handle 20 about equally overlapping the extremities of the upturned ends 14—15" of the locking handle 12, when the device is properly locked in non-draining position.

For convenience, suitable cooperating indicia, as indicated at 15A and 14A is provided on the upturned ends of the locking handle 12, and indicia 20A and 20B on the stem actuating handle member 20. By moving the adjacent ends of the two handle members 12 and 20 in the directions indicated by the arrows of the indicia, the device may be readily securely locked, or released, and the drain opened.

While the device, as disclosed in the drawing, includes two cooperating handle members 15'—20" and 14'—20', extending in opposite directions from the axial center of the axially movable stem, it is obvious that a lesser or greater number of cooperating lever arms could be employed, and also that the stem member may be utilized to operate various devices other than drain cocks, and the stem member may be mounted for rotative movement only, exclusive of any axial movement as disclosed in the drawing, without departing from the spirit of the invention as contemplated by the appending claims, in which

I claim:

1. In a locking device of the class described, a body, a threaded operating stem rotatably mounted in said body having a laterally projecting elongated actuating handle member at the end thereof and an annular reduced portion adjacent said handle member, and a jam nut member rotatably mounted on the threaded portion of said stem having a laterally projecting actuating handle for moving said jam nut into jamming relation with said body when the last mentioned handle is rotated in one direction and movable onto said annular reduced portion of said stem when the said handle thereof rotated in the opposite direction and freely rotatable while on said reduced portion.

2. In a locking device of the class described, a body, a threaded operating stem rotatably mounted in said body having a laterally projecting elongated actuating handle member at the end thereof and an annular reduced portion adjacent said elongated handle member, a stem locking member rotatably mounted on the threaded portion of said stem having a laterally projecting actuating handle for moving said stem locking member into jamming relation with said body when the last mentioned handle is rotated in one direction and movable onto the annular reduced portion of the stem when said last mentioned handle is rotated in the opposite direction, and resilient means on the stem between said locking member and said handle member for resiliently urging said locking member away from said stem handle member when said locking member is on the reduced portion of said stem, said laterally projecting handle members being positioned on said stem and said stem locking member when the stem locking member is in jamming relation with the body to occupy an acute angular relation to each other so that the ends of the operating handle members may be simultaneously grasped and moved toward each other to increase the jamming action or pried apart to relieve the jamming action, using one handle member as a purchase in moving the other handle member.

3. In a locking device of the class described, a body, a threaded operating stem rotatably mounted in said body having an elongated operating handle member projecting laterally therefrom and an annular unthreaded portion adjacent said handle member, a locking member threadedly mounted on the threaded portion of said stem to move axially thereof into jamming relation with said body and said stem when rotated in one direction and movable onto said annular unthreaded portion of the stem when rotated in the other direction, said locking member being freely rotatable on said annular unthreaded portion of said stem and having an elongated handle member projecting laterally therefrom and disposed in a small acute angular relation with respect to the laterally projecting operating handle member of the stem when the locking member is in jamming relation with said body, one of said handles being angularly bent adjacent its outer extremity toward the outer extremity of the other handle to dispose the said extremities of said handles adjacent each other in closely spaced acute angular relation to each other when the locking member is in locking position, whereby movement of the adjacent ends of the handles away from each other, when the locking member is in locking position, moves the locking member to release position, and movement of the adjacent ends of the handles toward each other rotates said locking member into tighter jamming engagement between the body and said stem.

4. In a safety device of the class described, a drain cock body, a rotary drain valve-operating stem therefor having a laterally extending operating handle rotatable in a plane substantially at right angles to the rotary axis of said stem to move the drain valve-operating stem to drain and non-drain positions, a jam nut threaded on said stem and rotatable into jamming relation with said body to lock said stem in non-draining position, said stem having a reduced portion adjacent said handle formed to receive said jam nut when rotated away from jamming relation with respect to said body and to permit free rotation thereof while on said reduced portion, spring means between the jam nut and the stem handle for resiliently urging said jam nut toward said threaded stem portion when on said reduced portion said jam nut having an elongated actuating handle member extending thereon and disposed in a plane substantially parallel to the rotative plane of the first mentioned handle and having the outer extremity thereof bent laterally toward the extremity of the other handle member on the stem and disposed in flush relation thereto, to occupy a close adjacent relation to the outer extremity of the stem operating handle when the jam nut is in jamming relation with the body and said drain valve-operating stem is in non-draining position.

5. In a locking device of the class described, a support, an elongated actuating member rotatably carried by the support, said actuating member having a laterally extending operating handle projecting therefrom, a locking member rotatably carried by the actuating member to move into locking engagement between said support and said actuating member upon rotation of the locking member in one direction for locking said actuating member against rotation on said support, and to move out of said locking engagement upon rotation thereof in the opposite direction, said locking member having an actuating handle projecting laterally therefrom adjacent the handle projecting from said actuating means, positioned to occupy an acute angular relation with respect to said actuating handle when the actuating member is in a definite predetermined position and the locking member is moved toward locking position, one of said handles having its end portions bent laterally toward the other handle to dispose the ends of the handles of the actuating and locking members adjacent each other in a predetermined closely spaced relation where the handle on the actuating member may be employed as a purchase for the actuation of a clamping or prying tool to move the handle on the locking member in one direction to locking position, and when in locking position to move the handle of the locking member in the opposite direction to move the locking member to a releasing position.

6. In a locking device of the class described, a drain cock body, a threaded valve stem member rotatable in said body between drain and non-drain positions, said stem having a laterally extending elongated operating handle projecting therefrom, a rotatable locking member threaded on the threaded portion of said stem and rotatable thereon into jamming engagement with said body when the stem is in non-drain position to lock said stem in said last mentioned position, said locking member having an elongated operating handle extending in a plane parallel to that of the stem handle in a small acute angular relation to the elongated operating handle of the stem when said stem is in non-draining position and said locking member is in locking position, one of said handles being longer than the other handle and having its end portion bent toward the other handle to dispose the end of the said bent portion in closely spaced relation to the end of the unbent handle with the end of the bent portion of the said handle disposed in offset relation to the end of the unbent handle, and positioned to just clear the same upon movement of the handles toward each other to increase the jamming action when the ends of the handles are squeezed together, and upon relative movement of said ends away from each other when the handle members are pried apart to rotate the locking member to release position.

7. In a locking device of the class described, a drain cock body, a hollow threaded valve-actuating drain stem rotatable in said body between drain and non-drain positions and having arms extending laterally therefrom in opposite directions to form an actuating handle member, a jam nut rotatably mounted on the threaded portion of said stem and movable into jamming relation with said body upon rotation thereof in one direction to lock said stem in non-draining position, said jam nut having handle means fixed thereon comprising a pair of arms extending laterally therefrom in opposite directions and disposed, when said jam nut is moved against said body and the valve-actuating stem is in non-draining position, in substantially parallel spaced relation to the oppositely extending arms of the handle member on the stem with the outer ends of the arms on the handle member disposed in spaced parallel relation in the plane of rotation adjacent the outer ends of the arms on the jam nut whereby movement of the spaced adjacent ends of the arms at one side of the stem and jam nut toward each other moves the jam nut to jamming position and movement of the other spaced adjacent ends of the arms at the opposite side of the stem and jam nut member toward each other moves the jam nut to release position with respect to said stem and body to permit rotation of said stem.

8. In a locking device of the class described, a drain cock body, a threaded rotatable drain valve-actuating stem carried by said body and rotatable therein between drain and non-drain positions and having a pair of oppositely extending arms forming a handle member disposed to rotate in a plane substantially perpendicular to the axis of the stem member, said stem member having an annular reduced portion formed therein adjacent said arms, a jam nut member rotatably mounted on the threaded portion of the stem member to move axially into jamming relation with said body when the jam nut is rotated in one direction to lock said stem member in non-draining position, said jam nut member being rotatable in the opposite direction to release said stem member and movable into the annular reduced portion on the stem member, spring means carried by said jam nut member between the handle member and said jam nut member engageable with the handle member when the jam nut member is moved into the reduced portion of the stem member to urge the jam nut member toward the threaded portion of the stem member, said jam nut member having a pair of actuating arms forming a handle extending laterally therefrom in opposite directions to rotate with the jam nut member in a plane substantially parallel with and adjacent to the plane of rotation of the stem handle member, the outer ends of the last mentioned arms being disposed in adjacent closely spaced parallel relation with respect to the outer ends of the arms of the stem handle member in the plane of rotation of the members when the jam nut is in jamming position and said stem member is in non-draining position, whereby movement of the adjacent outer ends of the arms of the stem and jam nut members projecting in one direction when pressed toward each other, tighten said jamming member, and when the adjacent outer ends of the other arms on the stem and jam nut members projecting in the opposite direction are pressed toward each other, the said jam nut member is moved to release position.

DAVID SAMIRAN.